(12) United States Patent
Lyon et al.

(10) Patent No.: US 10,060,059 B2
(45) Date of Patent: Aug. 28, 2018

(54) CROSS-CONTAMINATION PREVENTION WIPE

(75) Inventors: Bradley T. Lyon, Winston-Salem, NC (US); Jay C. Postlewaite, Winston-Salem, NC (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 155 days.

(21) Appl. No.: 13/354,118

(22) Filed: Jan. 19, 2012

(65) Prior Publication Data
US 2013/0185879 A1 Jul. 25, 2013

(51) Int. Cl.
| | | |
|---|---|---|
| *D04H 1/44* | (2006.01) | |
| *B32B 5/26* | (2006.01) | |
| *D04H 1/54* | (2012.01) | |
| *D04H 1/555* | (2012.01) | |
| *D04H 1/559* | (2012.01) | |
| *D04H 13/00* | (2006.01) | |
| *B32B 7/04* | (2006.01) | |

(52) U.S. Cl.
CPC .......... *D04H 1/44* (2013.01); *B32B 5/26* (2013.01); *B32B 7/04* (2013.01); *D04H 1/54* (2013.01); *D04H 1/555* (2013.01); *D04H 1/559* (2013.01); *D04H 13/00* (2013.01); *B32B 2262/02* (2013.01); *B32B 2305/186* (2013.01); *Y10T 156/10* (2015.01)

(58) Field of Classification Search
CPC .................................. A47L 13/16; A47L 1/15
USPC .................. 15/104.93, 104.94, 227, 118
See application file for complete search history.

(56) References Cited

U.S. PATENT DOCUMENTS

| | | | | |
|---|---|---|---|---|
| 4,888,229 A | * | 12/1989 | Paley | A47L 13/16 15/209.1 |
| 5,213,884 A | * | 5/1993 | Fellows | 442/263 |
| 5,507,906 A | * | 4/1996 | Woods et al. | 156/271 |
| 5,832,556 A | * | 11/1998 | Eyler | B08B 1/00 15/104.93 |
| 6,993,805 B2 | * | 2/2006 | Prodoehl | A47L 17/08 15/118 |
| 9,051,669 B2 | * | 6/2015 | Woods | B32B 3/08 |
| 2002/0032943 A1 | * | 3/2002 | James | A47L 13/19 15/227 |

(Continued)

FOREIGN PATENT DOCUMENTS

| | | |
|---|---|---|
| JP | H105162 | 1/1998 |
| JP | 2003052600 | 2/2003 |

(Continued)

OTHER PUBLICATIONS

European Patent Office, International Searching Authority, International Search Report and Written Opinion for PCT/US2013/022016 dated Jul. 23, 2013, 13 pages.

*Primary Examiner* — Christopher M Koehler
*Assistant Examiner* — Stephanie Berry
(74) *Attorney, Agent, or Firm* — Klintworth & Rozenblat IP LLP

(57) ABSTRACT

The present invention provides a cross-contamination prevention wipe, comprising a cleaning layer having fibers which collect and trap contaminants and a barrier layer which prevents transmission of the contaminants from the cleaning layer and through the barrier layer, wherein the barrier layer is directly bonded to the cleaning layer.

8 Claims, 4 Drawing Sheets

(56) References Cited

U.S. PATENT DOCUMENTS

| | | | | |
|---|---|---|---|---|
| 2003/0135181 | A1* | 7/2003 | Chen | A47L 13/16 604/374 |
| 2003/0186609 | A1* | 10/2003 | Booker, Jr. | 442/327 |
| 2004/0004196 | A1* | 1/2004 | DeMeo et al. | 250/516.1 |
| 2009/0017187 | A1 | 1/2009 | Li | |
| 2011/0189763 | A1* | 8/2011 | Brabetz et al. | 435/287.2 |

FOREIGN PATENT DOCUMENTS

| | | |
|---|---|---|
| JP | 2006291437 | 10/2006 |
| TW | I244500 B | 12/2005 |

\* cited by examiner

CROSS-CONTAMINATION PREVENTION WIPE

BACKGROUND

Cleaning wipes are an everyday feature in environments where the removal of contaminants may be necessary, for example as a result of a spill. The cleanliness requirements for objects used and people working in controlled environments, such as clean rooms, are very stringent. In particular, cleaning materials such as wipes for wiping spills and cleaning surfaces should be very clean to avoid contamination of the work in process in the room. For example, in the construction of semiconductor wafers, wipes are used for cleaning up spills which can occur during the procedures carried out in a controlled environment of a clean room. In addition, wipes are used for wiping surfaces of various equipment and items in controlled environments.

Unfortunately, traditional wipes fail to protect the gloves of operators from contact with the contaminants picked up by the wipes. The very nature of the wipe, which requires a high degree of absorbency, militates against a construction that resists wetting and contaminating a glove holding the wipe. Contaminants removed with the wipe, for example chemicals, nuclear materials, radio-chemicals and high potency active pharmaceutical ingredients (HPAPIs) may end up contaminating the glove, thereby requiring the disposal of the glove as hazardous waste. In addition, when different parts of a wipe are attached together with an adhesive, there is the risk that it may end up contaminating the items cleaned with the wipe, especially if the contaminants are in the liquid form.

SUMMARY

The present invention is defined by the appended claims and statements within this summary should not be taken as limitations on those claims.

In one aspect, the present invention provides a cross-contamination prevention wipe. The cross-contamination wipe comprises: a cleaning layer having fibers which collect and trap contaminants, and a barrier layer which prevents transmission of the contaminants from the cleaning layer and through the barrier layer, wherein the barrier layer is directly bonded to the cleaning layer.

In one aspect, the present invention provides a method for manufacturing a cross-contamination prevention wipe. The method comprises: directly bonding a cleaning layer having fibers which collect and trap contaminants with a barrier layer which prevents transmission of the contaminants from the cleaning layer and through the barrier layer.

In one aspect, the present invention provides a cross-contamination prevention wipe. The cross-contamination wipe comprises: a cleaning layer which collects and trap contaminants, and a barrier layer directly bonded to the cleaning layer, wherein the barrier layer prevents transmission of the contaminants from the cleaning layer and through the barrier layer, and wherein the cleaning layer is impregnated with a cleaning solution.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention provides a cross-contamination prevention wipe, which comprises a cleaning layer having fibers which collect and trap contaminants, a barrier layer which prevents transmission of the contaminants from the cleaning layer and through the barrier layer, wherein the barrier layer is directly bonded to the cleaning layer. When the wipe is in use, the barrier layer blocks contaminants from traveling from a contaminated surface to a glove and, when colored, also acts as a visual guide for determining the wipe surface used for decontamination. Proper wipe use thus reduces the requirement of contaminated glove disposal as hazardous waste. In addition, as the barrier layer is directly bonded to the cleaning layer, rather than attached with an adhesive, there is less risk of adhesives or other chemicals cross-contaminating from the wipe to a surface being cleaned when it is in use. It is to be understood, however, that minimal amounts of adhesives may be tolerated, provided that they are insufficient to cause significant cross-contamination when using the wipe.

Figure 1:
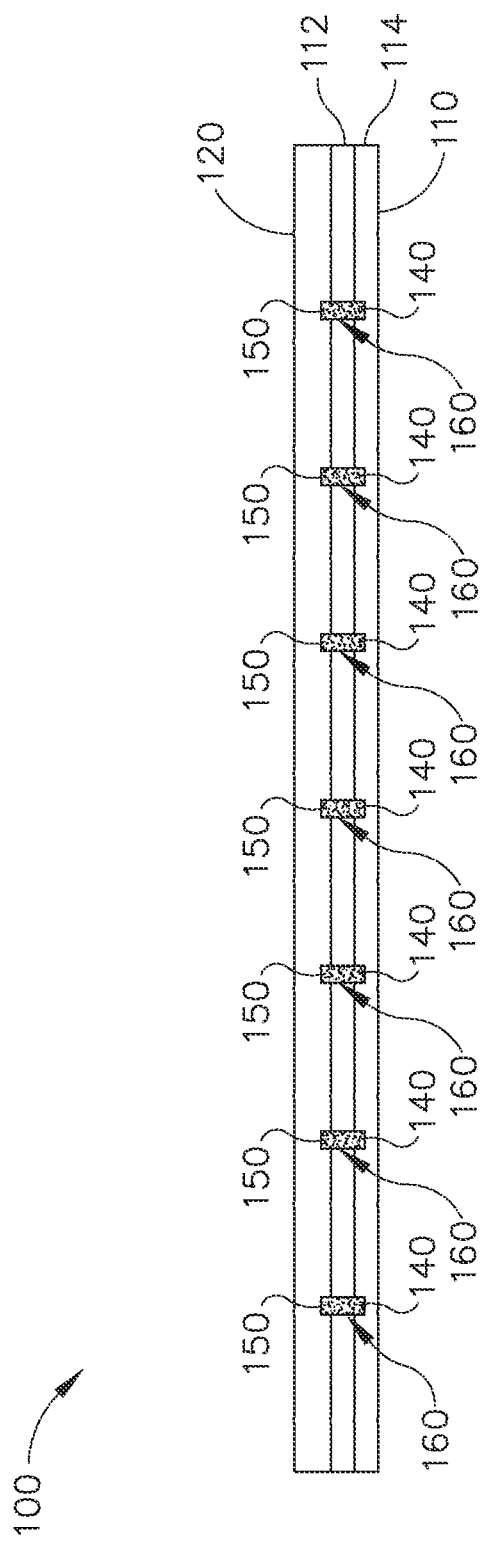
FIG. 1 is a side view of an example cross-contamination wipe according to the present invention.

With reference to FIG. 1, the present invention provides a cross-contamination wipe 100 comprising a cleaning layer 110 and a barrier layer 120. Cleaning layer 110 is preferably directly bonded to and in contact with barrier layer 120. The direct bonding between cleaning layer 110 and barrier layer 120 may be by means of mechanical fastening. Examples include stitching the layers together, clipping them to each other with staples, or using fasteners such as studs or buttons. Preferably, the bonding is achieved without forming breaks in the barrier layer 120, for example by fusing portions 140 of the cleaning layer 110 with portions 150 of the barrier layer 120, thereby forming fused areas 160. The fusing is preferably carried out by means of ultrasonic welding.

The cleaning layer 110 may be constructed with one or more of a variety of materials that have found their way in cleaning wipes. Example materials include natural fibers such as cotton and synthetic fibers such as polyesters, and blends thereof. When the bonding to the barrier layer 120 is achieved by welding, the material of the cleaning layer 110 is preferably one that fuses when heated. Accordingly, the cleaning layer 110 preferably includes polymer-based fibers of polymeric materials that can fuse with parts of the barrier layer 120 when heated. Among these materials are polyester, nylon, polypropylene and blends thereof. The materials may be knitted, woven or non-woven fabric. The preferred material is a knitted polyester material, preferably knitted from a continuous filament. Preferred polyester materials include polyglycolide (PGA), polylactic acid (PLA), polycaprolactone (PCL), polyethylene adipate (PEA), polyhydroxyalkanoate (PHA), polybutylene terephthalate (PBT), polytrimethylene terephthalate (PTT), polyethylene naphthalate (PEN), Vectran, and blends thereof.

The cleaning layer 110 may also include a first interwoven fibrous layer 112 bonded with a second interwoven fibrous layer 114. Preferably, the first fibrous layer 112 is directly bonded to the second fibrous layer 114 by fusing portions of the first fibrous layer 112 with portions of the second fibrous layer 114 or by mechanically fastening portions of the first fibrous layer 112 with portions of the second fibrous layer 114, for example by means of stitches, clips, or other fastening means.

The barrier layer 120 may be made with any material or membrane which can prevent contaminants from crossing through the barrier layer 120. Plastics, rubbers, metals, and ceramics provide non-limiting examples of materials that may be part of the barrier layer 120. The barrier layer 120 may also contain radiation-resistant materials for applications on radioactive materials and radio-chemicals. Thermoplastic materials are preferred, such as polyethylene, polypropylene, polystyrene, polyvinyl chloride, polytetrafluoroethylene, and combinations thereof. Polyethylene is more preferred, and low density polyethylene is particularly preferred. The barrier layer 120 is preferably 0.5 mm to 5 mm in thickness. More preferably, the thickness of the barrier layer 120 is at least 1 millimeter to at most 10 mil, and most preferably at least 3 mil to at most 5 mil. The ideal thickness of the barrier layer 120 may vary, provided that it is sufficient to prevent a melt-through of the barrier layer 120 during welding to the cleaning layer 110. In other words, the barrier layer 120 should be thick enough that, if it is welded to the cleaning layer 110, the side of the barrier layer 120 opposite the cleaning layer 110 does not melt. Preferably, the barrier layer 120 forms an outer surface having a surface area greater than 500 $cm^2$, so as to fully cover a gloved hand.

Figure 2:
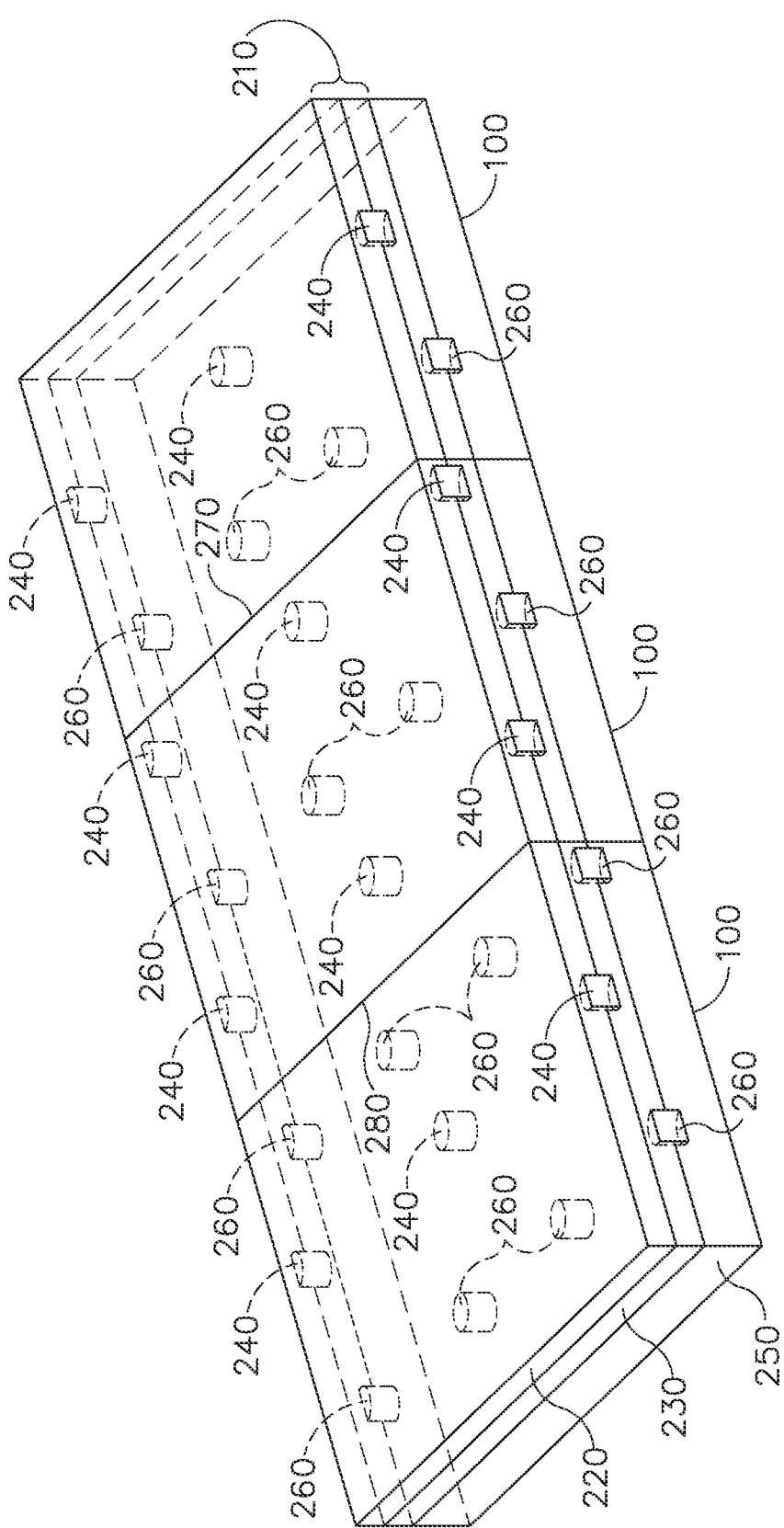
FIG. 2 is a perspective view of an example method for manufacturing a wipe according to the invention.

Turning now to FIG. 2, a preferred manufacturing technique for making a plurality of wipes 200 is to sever the wipes from a cleaning sheet 210 of indeterminate dimensions made of a cleaning material. The cleaning sheet 210 is preferably manufactured from a first fabric sheet 220 and a second fabric sheet 230. Preferably, the first fabric sheet 220 and second fabric sheet 230 are welded together by fusing together areas of the first fabric sheet 220 and areas of the second fabric sheet 230, thereby forming first fused areas 240. Preferably, the first fused areas 240 form a pin dot pattern, but other patterns may be used. Also preferably, the first sheet 220 and second sheet 230 are welded together by means of ultrasonic welding. A barrier sheet 250 for making the barrier layer 120 is then directly bonded to the cleaning sheet 210, by preferably fusing together areas of the barrier sheet 250 and areas of the cleaning sheet 210, thereby forming second fused areas 260. Also preferably, the barrier sheet 250 is directly bonded to the cleaning sheet 210 by ultrasonic welding. The cleaning sheet 210 is then severed along severed lines 270 and 280, to establish each individual wipe 100.

Although the illustrative examples above describe wipe 100 used, one having skill in the art will appreciate that wipes and methods of manufacturing consistent with the present invention are not limited thereto. For example, the first fused areas 240 may be in patterns differing from pin dots. Moreover, first fabric sheet 220 and second fabric sheet 230 may be of the same or different fabric materials, and may be bonded together by means other than welding. For instance, the sheets may be stitched or clipped together. Similarly, the barrier sheet 250 may be mechanically fastened to fabric sheets 220 and 230, rather than welded. Additionally, the fabric sheets may be more than two.

Possible uses for wipes 100 include cleaning surfaces, instruments, tools, sampling ports, spills and contaminated areas in nuclear facilities, pharmaceutical isolators found in hospitals and pharmacies, bio-manufacturing facilities, aerospace, automotive manufacturing facilities or any environment needing a wipe apparatus for cleaning to remove radioactive and nonradioactive chemical and nonchemical contaminants, including nuclear materials, radio-chemicals and high potency active pharmaceutical ingredients (HPAPIs) used as medicines, biologically contaminated solutions, other fibers, dusts and microscopic particles; draping a disinfectant or sterilant-saturated wipe 100 on surfaces to maintain surface wetness for improved activity; covering flammable liquids to quickly reduce their vapor pressure; or applying chemicals other or materials to surfaces in bio-manufacturing, nuclear, automotive, aerospace, or pharmaceutical facilities.

Figure 3:
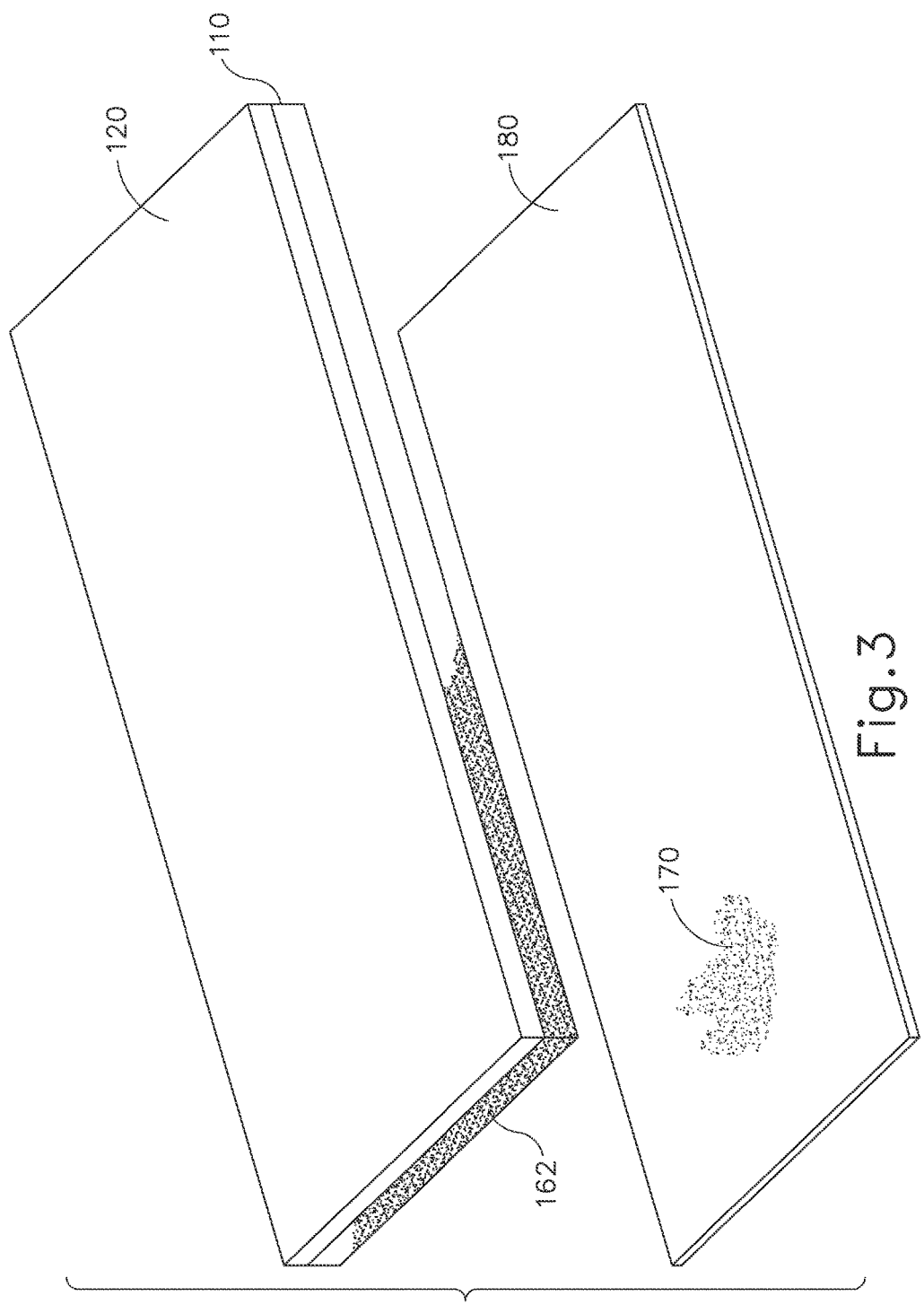
FIG. 3 is a perspective view of an example wipe according to the invention impregnated with a cleaning solution in order to clean contaminants from a surface.

Turning now to FIG. 3, wipe 100 preferably includes a cleaning layer 110 at least partially impregnated with a cleaning solution 160, such as an alcohol-water solution, a surfactant solution, a chemical treatment solution, and mixtures thereof. A preferred cleaning solution 162 includes 70% aqueous isopropanol. The cleaning solution 162 in the wipe 100 reduces adhesion forces that hold contaminants 170 to a surface 180 allowing the contaminants 170 to be captured into the cleaning layer 110 for removal. The cleaning solution 162 cleans as well as indicates where cleaning has occurred until the cleaning solution 162 has completely evaporated or dried. This will help ensure that all areas needing to be cleaned are cleaned. The use of a pre-wet wipe 100 also encourages the use of proper cleaning protocols by reducing the spread of contaminants 170 induced by using a spray cleaning fluid dispenser outside the area to be cleaned and thus allows for better contamination control. Pre-wet wipes 100 may be commercialized in hermetically sealed kits containing, for example, 10 to 100 wipes.

A sterile version of the clean room wipe 100 is used similarly with the added benefit of not bringing viable bio-burden into aseptic environments such as vaccine manufacturing facilities. A sterile dry clean room wipe 100 having no cleaning solution 162 is available for those who have a preferred or alternate cleaning solution. The clean room wipe 100 may be subject to re-use, following removal of contaminants in a clean room washer and drying in a clean room dryer meeting at least ISO. Class 5 standards.

Figure 4:
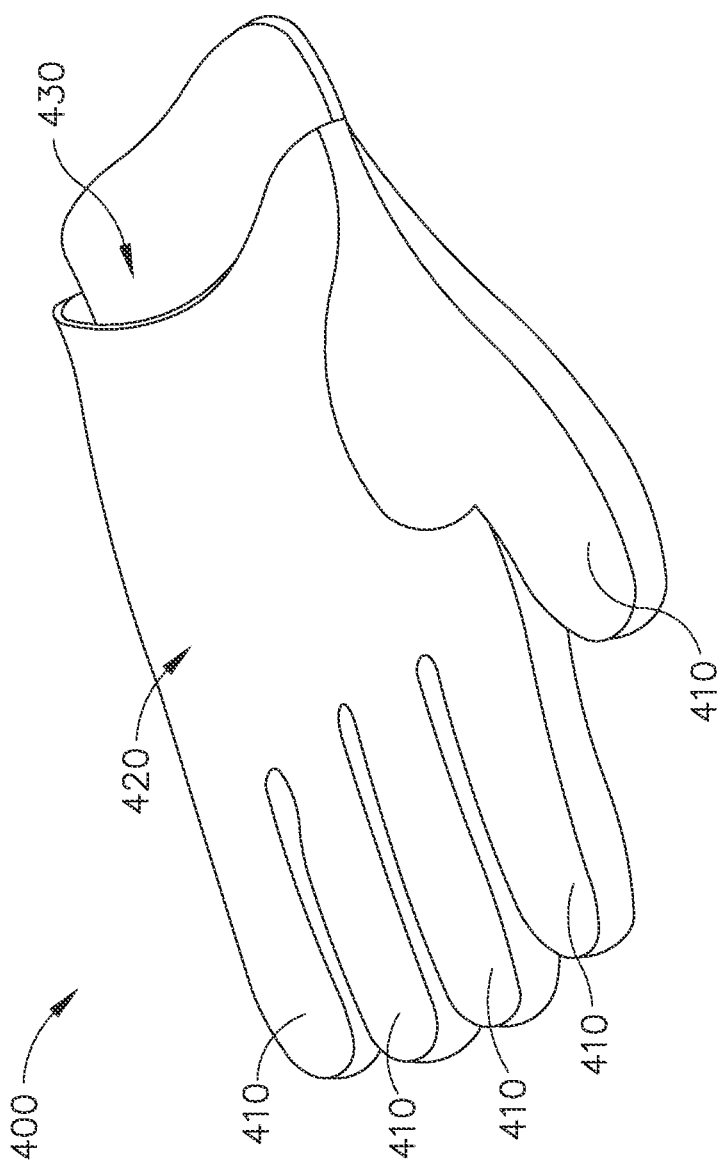
FIG. 4 illustrates a mitt according to the present invention.

In another example, the wipe 100 may be fashioned into a mitt, so that the barrier layer 120 is on the inside, thereby allowing for the entirety of the cleaning layer 110 to be utilized. A mitt may be manufactured, for example, by folding wipe 100 on itself and binding its edges together, for example by stitching, clipping with staples, using fasteners such as studs or buttons, or fusing the edges together. As illustrated in FIG. 4, in one embodiment, the mitt 400 conforms to a user's hand by forming five finger portions 410, each finger portion forming an opening for receiving a user's finger and shaped to surround a user's finger. The mitt also forms a palm receiving portion 420 having an opening 430 sized to receive a user's hand and shaped to surround a user's palm. Preferably, the mitt is at least 25 cm in length with a wrist opening of at least 10 cm.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A cross-contamination prevention wipe, comprising:
   a cleaning layer having fibers which collect and trap contaminants, the cleaning layer including a first interwoven fibrous layer and a second interwoven fibrous layer, wherein the first interwoven fibrous layer and the second fibrous layer are fused together at first fused areas; and
   a barrier layer which prevents transmission of the contaminants from the cleaning layer and through the barrier layer, wherein the barrier layer is fused to the first interwoven fibrous layer at second fused areas, wherein the second fused areas are different than and spaced apart from the first fused areas;
   wherein the barrier layer includes a first side and a second side opposite the first side, wherein the first side engages the first interwoven fibrous layer and forms part of the second fused areas, and wherein the second side of the barrier layer is not part of the second fused areas and does not melt as a result of the barrier layer being fused to the first interwoven fibrous layer.

2. The wipe of claim 1, wherein the cleaning layer includes polymer-based fibers which are fused to the barrier layer.

3. The wipe of claim 1, wherein the cleaning layer is impregnated with a cleaning solution.

4. The wipe of claim 1, wherein the wipe is a mitt.

5. A kit comprising a container and the wipe of claim 1.

6. The kit of claim 5, wherein the cleaning layer is impregnated with a cleaning solution.

7. The kit of claim 6, wherein the cleaning solution is selected from a group consisting of alcohol-water solutions, surfactant solutions, chemical treatment solutions, and mixtures thereof.

8. The kit of claim 6, wherein the cleaning solution is an isopropanol-water solution.

* * * * *